United States Patent [19]

Nguyen et al.

[11] 4,276,319
[45] Jun. 30, 1981

[54] PROCESS FOR THE PRODUCTION OF A GRANULATED PROTEIN GEL SUITABLE AS A MEAT EXTENDER

[75] Inventors: Thanh V. Nguyen, St. Louis; Thomas J. Wagner, Hillsboro, both of Mo.

[73] Assignee: Ralston Purina Company, St. Louis, Mo.

[21] Appl. No.: 4,108

[22] Filed: Jan. 17, 1979

[51] Int. Cl.$^3$ ............................................... A23J 3/00
[52] U.S. Cl. .................................. 426/574; 426/656; 426/802
[58] Field of Search ............... 426/104, 573, 574, 656, 426/802

[56] References Cited

U.S. PATENT DOCUMENTS

| | | | |
|---|---|---|---|
| 3,488,770 | 1/1970 | Atkinson | 426/656 X |
| 3,498,794 | 3/1970 | Calvert et al. | 426/656 |
| 3,800,053 | 3/1974 | Lange | 426/656 |
| 3,814,823 | 6/1974 | Yang | 426/656 X |
| 3,851,081 | 11/1974 | Epstein | 426/573 X |
| 4,039,694 | 8/1977 | Giddey et al. | 426/574 |
| 4,133,901 | 1/1979 | Fetzer et al. | 426/573 |

Primary Examiner—Robert A. Yoncoskie
Attorney, Agent, or Firm—Virgil B. Hill

[57] ABSTRACT

A process for the production of a dense, granulated protein gel is disclosd which is readily rehydratable with water at ambient temperatures, and upon rehydration with water functions as a meat extender in various natural meat products. The textured, granulated gel is prepared by hydrating a vegetable protein isolate having superior gel forming properties and a protein content of at least 90% by weight, followed by heating of the hydrated protein at a temperature between about 75°–125° C. to form a protein gel. The gel is granulated and dried to form a textured protein material which has excellent rehydration characteristics and is highly functional as a meat extender.

14 Claims, No Drawings

PROCESS FOR THE PRODUCTION OF A GRANULATED PROTEIN GEL SUITABLE AS A MEAT EXTENDER

BACKGROUND OF THE INVENTION

This invention relates to a process for the production of a granulated protein gel which is readily rehydratable with water, and upon rehydration is suitable as a meat extender.

Vegetable protein products including soy flour, isolates and concentrates have become widely used and accepted food ingredients. Among the vegetable protein products which have been the most widely accepted are the textured vegetable protein materials which have gained wide acceptance as a meat extender. The extended meat products are comparable in nutrition and quality to the natural meat products.

A variety of textured vegetable protein materials and processes for the production have been proposed. Generally recognized as one of the first processes for texturization of protein was that described in U.S. Pat. No. 2,682,466. Edible protein filaments were produced by a spinning process similar to that for the spinning of textiles. The starting material for this texturization process was a protein isolate, which has the bulk of oil and carbohydrates removed to achieve a protein content of 90-95% by weight on a dry basis.

Although numerous texturization techniques have been proposed for materials of lower protein content such as soybean meal, soy flour or concentrates, the most widely used and commercially successful technique for the texturization of vegetable protein materials is the extrusion process described in U.S. Pat. No. 3,940,495. This process produces an expanded, meat simulating product which is capable of rehydration with water and upon rehydration is highly suitable as a meat extender. This type of extender was approved for use for the School Lunch Program by the U.S. Department of Agriculture, Food and Nutrition Service (FNS Notice 219) and since then has found wide usage in this program as well as by meat processors for the production of extended meat.

Other texturization processes too numerous to categorize have also been proposed following development of the extrusion process. These processes including the extrusion process, employ lower protein content vegetable protein materials as well as vegetable protein isolates. Some of these processes describe variations in the extrusion process described above in U.S. Pat. No. 3,940,495 for achieving differences in density or functionality of the textured product as well as an improvement or modification of the flavor or texture of the resultant product. Other processes have been directed to the production of non-expanded textured products, for example, an agglomerated protein material as described in U.S. Pat. No. 4,045,590 or an unpuffed proteinaceous extrudate as described in U.S. Pat. No. 3,498,794 and 3,968,268.

The non-expanded products generally exhibit poorer rehydration properties than the expanded materials, requiring longer times or extreme temperatures to achieve maximum rehydration capacity. Therefore, the non-expanded products are more suitable in canned products which employ significant amounts of water and use higher temperatures during retort cooking of the product. Hydration rate of the textured material is less of a factor in this type of product. The expanded products have therefore proven to be more successful as an extender in ground meat applications than the non-expanded products because of a better hydration rate as well as the formation of a mixture more nearly approximating that of natural meat.

In spite of the commercially developed nature of the textured vegetable protein industry, a continuing need exists for specific types of textured materials exhibiting specific functional properties for various food uses.

An object of the present invention is to present a process for the production of a textured vegetable protein material which has a high hydration capacity or ability to absorb water. It is also an object to provide a process for the production of a textured vegetable protein material which rehydrates rapidly with water under ambient conditions.

It is also an object to provide for the production of a textured protein material from a vegetable protein isolate which exhibits the above rehydration characteristics and blends well with ground meat to provide a mixture comparable to the natural meat.

It is a further object to provide a process for the production of the above material which is convenient and reliable to practice on a commercial basis.

SUMMARY OF THE INVENTION

These and other objects are achieved in the present invention for producing a dried, granulated protein gel which has excellent rehydration properties and upon rehydration is useful as an extender for natural meat products. The dried granulated protein gel is produced by a process which comprises, hydrating vegetable protein isolate having a protein content of at least 90% by weight with sufficient water to provide a mixture having an added water level of between about 60-75% by weight. The hydrated isolate is then heated, preferably in an extrusion device, at a temperature of between 75°-125° C. to form a protein gel. The protein gel is then granulated or subdivided and dried. The resultant dried gel is an excellent meat extender with unique rehydration characteristics. Most textured unexpanded vegetable protein materials require a relatively long period of time to achieve maximum hydration capacity and higher water temperatures for maximum hydration rate, however, the granulated gel of the present invention having a typical particle size distribution described in the present invention hydrates to its maximum hydration capacity of 4-5 times its weight in water within a relatively short period of 30 minutes or less, and at room temperature. Furthermore, upon addition of the rehydrated granules to a mixture of ground meat, the granules do not detract from the appearance, texture or flavor of the ground meat.

An essential characteristic of the process of the present invention is the selection of a vegetable protein isolate that has superior gel forming properties. This facilitates the production of the gel granules pursuant to the process of the present application and results in a product which has the excellent rehydration characteristics desired in the product of the present invention. Accordingly, the selection of a suitable isolate with gel forming properties is an important aspect of the present process, since the functional properties of the gel granules are directly related to the gel forming properties of the starting material. Therefore, in the present application for the purpose of defining those isolates which exhibit the desired gelling characteristics, a functional test for gel forming ability is hereinafter set forth by which one skilled in the art can determine a suitable material for the process of the present invention. A suitable isolate for use in the present invention will have the ability to form a gel with water as the only other ingredient, upon heating of the mixture at a temperature of 100° C. for a period of 30 minutes with sufficient gel strength such that at least about 50 g of force preferably above about 100 g is required to break the surface of the gel, the gel being formed and the force applied according to the procedure which is set forth in detail below.

The selection of this type of isolate, together with the other steps set forth in the present invention results in a protein gel granule, which functions as a textured meat extender upon rehydration with water.

DESCRIPTION OF THE PREFERRED EMBODIMENTS

The granulated, textured protein gel of the present invention with its unique rehydration properties initially depends upon the selection of a starting material having superior gel forming properties. A suitable starting material is a vegetable protein isolate which typically has a protein content of at least about 90% on a dry weight basis.

Vegetable protein isolates are a well known product from the processing of vegetable protein and typically are obtained by solubilization of the protein from a vegetable protein source such as soybeans, followed by removal of the extracted or spent residue. Subsequent acid precipitation of the solubilized protein results in a high purity proteinaceous material. Drying of the precipitated protein provides an isolate with greater than 90% protein on a dry basis.

The granulated protein gel of the present invention depends upon the use of a vegetable protein isolate having superior gel forming properties, which broadly is defined as the ability to form upon heating, a stable and coherent gel at a relatively low solids level with water as the only other ingredient. It has been determined that vegetable protein isolates, such as soy isolates, exhibit a wide variation in gel forming properties. Although it is impossible to determine all of the factors in the processing of protein isolates that controls the ability of the isolate to readily form a good aqueous gel, pursuant to a better understanding of the type of protein isolate which exhibits the desired gel forming properties for use in the process of the present invention a procedure to evaluate the gel forming ability of a protein isolate is set forth below. The procedure measures the strength of a protein gel formed with a given protein isolate upon heating at a specified temperature for a specified period of time, when water is the only other ingredient besides the isolate in forming the gel. The force required to rupture or penetrate the gel by a spherical probe on a suitable testing device such as an Instron Test apparatus, can be directly correlated with the better gel forming protein isolates, since the applied force is directly related to the gel strength which in turn defines a material with superior gel forming properties.

Therefore, to determine if a protein isolate has the necessary gel forming properties for use in the present invention the following procedure is set forth to measure the strength of the aqueous protein gel formed with a particular type of protein isolate.

PROCEDURE TO MEASURE GEL FORMING PROPERTIES OF PROTEIN ISOLATES

Preparation of Protein Gel

Equipment

1. Silent cutter—Model #84141, Hobart Manufacturing Co.
2. Balance—±0.1 g, 3 kg capacity
3. Stopwatch
4. Brookfield LVT Viscometer with Helipath Stand, including T Spindles—Brookfield Co. 240 Cushing St., Strongton, MA
5. 400 ml beaker or suitable container for viscosity measurement
6. 7 oz. cans (307×113)
7. Boiling water bath Procedure 1. Weigh about 300 g of the selected protein isolate into the silent cutter and add sufficient water (25° C.) so that a solids content of 14% is achieved.
2. Begin mixing and stop to remove any dry protein material from sides or head of apparatus, and blend back into slurry.
3. Within 5 minutes after preparing the protein slurry measure the viscosity on the Brookfield Viscometer which is equipped with the Helipath Stand, using a T Spindle.
4. Viscosity measurements are made with the noted apparatus, employing a spindle in the form of an inverted T at 6 rpm. As the spindle is rotated by the Viscometer, the Helipath Stand lowers it through the test material. Three readings are taken over a period of about 1 minute following total immersion of the T Spindle in the test slurry.
5. If the average viscosity of the slurry is above or below $0.9$-$1.1 \times 10^6$ cps, adjust the solids level of the slurry by adding either water or isolate to achieve the desired viscosity range.
6. After the proper viscosity is obtained, continue to mix in the silent cutter for an additional period of time such that the total mixing time does not exceed 10 minutes. If for example, several solids adjustments are made to achieve the proper viscosity and a longer total mixing time than 10 minutes is achieved, discard the sample and prepare a new one.
7. After mixing, fill four 7 oz. cans with the slurry and seal the cans.
8. Boil the cans in a 100° C. water bath for 30 minutes.
9. Chill the heated cans immediately in an ice bath and refrigerate overnight at 4° C. prior to Instron evaluation of the formed gel. Allow sample to equilibrate to a temperature of 25° C. prior to Instron evaluation.

Instron Evaluation of Gel

1. The Instron Test apparatus employed is set to operate with a crosshead speed of 2.5 in/min and a chart speed of 10 in/min. The apparatus is equipped with a spherical probe (22.2 mm) which is used to puncture the surface of the gel in the can.
2. Gram weights of force are applied through the probe on the gel contained in the can. The probe is moved a distance of 1.20 inches and the force measured. This can be repeated on several samples to obtain an average value for the applied force.
3. The force required to indent or puncture the surface of the gel is directly represented on the chart as peak height.

Accordingly, for the purposes of the present invention, a suitable starting material will have the desired gel forming properties if the protein gel formed according to the above procedure has sufficient strength to require at least 50 g of force to penetrate the surface of the gel.

Typical soy protein isolates which have been found to have the gel forming properties required for use in the present invention include by tradename "Supro 620" manufactured by Ralston Purina Company, St. Louis, Missouri, "Promine D" manufactured by Central Soya Company, Ft. Wayne, Indiana. A number of batches of these isolates were formed into a gel according to the above procedure, and the gel strength measured on separate days to provide illustrative but non-limiting values for gel strength. These are set out in Table 1 below. In each test except one, there were three separate readings of the force required to break the gel. It may be seen that a significant variation in day to day readings can occur although in every case the force value is well above the minimum required.

TABLE I

Typical Gel Strength Values for Various Soy Protein Isolate

| Sample | Solids Level for Required Viscosity | Average Viscosity of Slurry (cps) | Force (g) |
| --- | --- | --- | --- |
| Day 1 | | | |
| Supro 620 Batch #1 | 14% | 1.12 × 10$^6$ | 220 232 350 |
| Supro 620 | 13% | 0.96 × 10$^6$ | 122 111 109 |
| Promine D | 15% | 0.96 × 10$^6$ | 211 263 223 |
| Day 2 | | | |
| Supro 620 Batch #1 | 14% | 0.96 × 10$^6$ | 216 |
| Day 3 | | | |
| Supro 620 Batch #1 | 14% | 1.01 × 10$^6$ | 283 349 287 |

Although the above isolates represent suitable and preferred isolates for use in the present invention, other isolates may also be suitable or certain batches of the above isolates may not always have the desired gel forming properties and therefore must be evaluated according to the above procedure prior to use in producing the granulated protein gel of the present invention.

The vegetable protein isolate is then hydrated with water to provide a level of moisture in the protein isolate of between about 60–75% by weight, with a preferred level of water of between about 65–70% by weight. The isolate can be hydrated in any suitable type of mixing apparatus preferably under ambient conditions, to provide a material of uniform consistency. Hydration of the protein is an essential element of the process of the present invention and if a lower amount of water is employed to hydrate the protein, a poor product is obtained.

Following hydration of the protein isolate, the hydrated isolate is heated to a temperature of between about 75°–125° C. preferably between about 80°–100° C., to form a proteinaceous gel that has a translucent appearance following heating. Although other apparatus may be suitable for carrying out the heating step and therefore formation of the gel, the preferred manner of heating the hydrated protein is to do so in an extruder, equipped with one or more restricted orifices to form the gel and shape it into a coherent and continuous stream of product exiting the die. The types of and degree of restriction in the extruder are not critical to the practice of the present invention. The relatively low temperatures employed in the extruder usually does not create significant amounts of pressure, depending on the extruder employed. The degree of restriction or types of dies employed are well within the skill of the extruder operator depending on the apparatus, rate of production, etc.

The temperature ranges which are set forth above for forming the protein gel of the present invention, at least in the use of an extruder, refer to the product temperature just prior to the die. Extrusion of the hydrated protein results in a continuous stream of the protein gel which has a translucent appearance and can be easily granulated and dried. Although other types of apparatus can be employed, an extruder provides the most reliable and convenient means of heating the hydrated protein on a continuous basis to form the protein gel of the present invention.

Following formation of the proteinaceous gel, the continuous stream of product can be subdivided and granulated to an appropriate size for use as an extender for ground meat. A typical particle size distribution for the dried granulated gel of the present invention is such that, substantially all of the granulated product is less than 2000 microns in size, and typically with a size distribution of from at least about 400 to about 2000 microns. The granulated gel which still contains a relatively high level of moisture is then dried for a sufficient period of time to achieve a shelf stable moisture content of typically 10% by weight or less. Drying can be carried out in any type of conventional food dryer, and the particular type of apparatus is not critical, this being dependent on the rate of drying desired, air temperatures obtained in the dryer as well as production rate for the product.

Drying is carried out under temperature conditions that avoids puffing of the product, which can occur if the granulated, undried product is subjected to relatively high temperatures for a short period of time so as to cause a rapid vaporization of product moisture with resultant puffing of the product. Therefore, it is preferred to employ an air temperature in the dryer that does not exceed about 250° F. and preferably between about 190°–210° F. at least for a forced air dryer for a period of time between 30 minutes and 2 hours. Other temperatures may be suitable, either above or below this depending on the drying apparatus employed. The specific temperature range employed for drying is not intended to limit the present invention.

Drying the product under non-puffing conditions provides a dried, granulated gel, characterized by a dense, coherent structure. The unique characteristic of the granulated gel of the present invention is its ability to rehydrate rapidly in spite of its relatively dense structure. Rehydration characteristics of the granulated gel of the present invention is intended to refer to both the maximum capacity of the gel insofar as water absorption as well as the rate it will achieve its maximum adsorption capacity. Both the amount and rate of hydration are important factors to the use of a textured protein product as a meat extender.

The granulated, dried gel of the present invention not only has excellent rehydration capacity, it achieves this capacity in a relatively short period of time at ambient or lower temperatures. As a specific example, the product of the present invention with a typical particle size distribution disclosed in the present invention, rehydrates with water at 25° C. to capacity of 3.5–4.0 times its weight in water within 15 minutes or 4–5.0 times its weight in water in 30 minutes and up to 6–6.5 times its weight in water after 2 hours. In some meat applications, it may be desirable to employ water at a lower temperature than ambient, in which case these times may vary from those typical rates set forth above, however, the resultant product rehydrates exceptionally well and when added to ground meat as an extender does not detract from the appearance or flavor of the meat either before or after cooking.

The following Examples are intended to disclose illustrative but non-limiting embodiments of the present invention.

EXAMPLE 1

1000 gm of a soy protein isolate identified by the tradename "Supro 620" and sold by Ralston Purina Company, St. Louis, Missouri, was evaluated for gelling properties according to the procedure set forth above wherein replicate samples of a gel were prepared using the isolate. The force required to penetrate the surface of each gel sample was 100 g and 88 g respectively.

The 1000 gm of isolate was blended with water in a Hobart mixer, wherein 2000 g of water was sprayed on the isolate and mixed until the protein was hydrated to a moisture level of 67% by weight.

The hydrated protein isolate was fed into a Brabender extruder employing a feed screw with a 2:1 compression ratio. The extruder screw was rotated at 140 rpm and the extruder was equipped with a ¼" round die. The three heating zones of the extruder barrel were heated by electrical means to a temperature of 220° F.

The product exiting the die as a continuous rope was observed as a coherent, homogeneous product with a translucent appearance. A thermocouple attached to the extruder measured the product temperature in the third zone of the extruder before the die at 89° C.

The continuous stream of product was subdivided to form a granulated material having a measured moisture content of 62% by weight. The granulated material was dried on a forced air dryer operated at a temperature of 150° F. for 1 hour to a moisture level of 4% by weight. The dried, granulated material was evaluated for rehydration properties according to the following procedure.

Rehydration rate of the material was measured by placing duplicate sets of three 20.0±0.1 gm samples of the granulated material into three separate Erlenmeyer flasks. 100 ml of water at a temperature of 25° C. was added to each sample of material. One flask was allowed to stand without agitation for 5 minutes, another for 15, and the third for 30 minutes. After rehydration of each sample for the specified period of time, the rehydrated product was strained from the remaining liquid into a graduated cylinder and the volume of liquid recorded.

The amount of water absorbed per g of sample was calculated as per the following:

$$\frac{\text{ml of water added} - \text{ml of water remaining}}{\text{g of sample}} = \text{ml water absorbed/g of sample}$$

The maximum hydration capacity of the granulated material was evaluated by a procedure which was essentially the same as the above except the sample was allowed to rehydrate for 2 hours and 200 ml of water was added to the sample. The amount of water absorbed per gram of sample was calculated as set forth above.

The granulated protein gel produced by the above procedure absorbed water at the following rate.

|  | g H$_2$O/g of product | | |
| --- | --- | --- | --- |
|  | 5 minutes | 15 minutes | 30 minutes |
| Set #1 | 3.8 | 4.2 | 4.4 |
| Set #2 | 3.8 | 4.5 | 4.6 |

The maximum hydration capacity of the granulated protein gel measured by the above procedure was calculated as 5.9 gm of water/g of product.

EXAMPLE 2

1000 gm of a soy protein isolate identified by the tradename "Supro 620" and sold by Ralston Purina Company, St. Louis, Mo., was evaluated for gelling properties according to the procedure set forth above. Triplicate samples of a gel were prepared with the isolate. The force required to penetrate the surface of each gel sample was 112 g, 111 g and 109 g respectively. The 1000 g of isolate was blended with water in a Hobart mixer, wherein 2000 g of water was sprayed on the isolate and mixed until the protein was hydrated to a moisture level of 67% by weight.

The hydrated isolate was extruded on a Brabender extruder as described in Example 1, and the temperature of the product in the third zone of the extruder before the die was measured as 86° C. The continuous stream of product was then granulated and the moisture content was measured as 62% by weight. The granulated material was dried as described in Example 1 to a moisture level of 5% by weight.

Rehydration rate and maximum rehydration capacity of the dried granulated material was evaluated as set forth in Example 1 and determined to be the following:

|  | Hydration Rate | | |
| --- | --- | --- | --- |
|  | g water/g of product | | |
|  | 5 minutes | 15 minutes | 30 minutes |
| Set #1 | 3.4 | 4.3 | 4.7 |
| Set #2 | 4.1 | 4.5 | 4.7 |
| Maximum Hydration Capacity | 6.4g of water/g of product. | | |

EXAMPLE 3

1000 g of the isolate identified in Example 2 was blended with water in a Hobart mixer wherein 3000 g of water was sprayed on the isolate and mixed until the protein was hydrated to a moisture level of 72% by weight. The hydrated isolate was extruded through a Brabender extruder as described in Example 1. The temperature of the product in the third zone of the extruder before the die was measured as 99° C.

The stream of product was then granulated, and the moisture content measured by analysis as 72% by weight. The granulated material was dried as set forth in Example 1 to a moisture level of 6% by weight.

Rehydration rate and maximum rehydration capacity of the dried granulated material was evaluated as set forth in Example 1 and determined to be the following:

|  | Hydration Rate g Water/g of Product | | |
| --- | --- | --- | --- |
|  | 5 minutes | 15 minutes | 30 minutes |
| Set #1 | 3.6 | 4.7 | 4.8 |
| Set #2 | 3.5 | 3.8 | 4.0 |
| Maximum Hydration Capacity (duplicate samples) | 5.8g of water/g of product 6.1g of water/g of product. | | |

EXAMPLE 4

1000 g of the isolate identified in Example 2 was blended with water in a Hobart mixer wherein 2000 g of water was sprayed on the isolate and mixed until the protein was hydrated to an added moisture level of 67% by weight. The hydrated isolate was extruded on a Brabender extruder as described in Example 1 except the three heating zones of the extruder barrel were operated at a temperature of 260° F. The temperature of the product just prior to exit from the die was measured as 121° C.

The stream of product was granulated and the moisture content measured by analysis as 68% by weight. The granulated material was dried as set forth in Example 1 to a moisture level of 2% by weight.

Rehydration rate and maximum rehydration capacity of the dried granulated material was evaluated as set forth in Example 1 and determined to be the following:

|  | Hydration Rate g Water/g of Product | | |
| --- | --- | --- | --- |
|  | 5 minutes | 15 minutes | 30 minutes |
| Set #1 | 2.8 | 3.7 | 4.1 |
| Set #2 | 3.0 | 3.8 | 4.1 |
| Maximum Hydration Capacity | 6.2g of water/g of product. | | |

EXAMPLE 5

1000 g of the isolate identified in Example 2 was blended with water in a Hobart mixer wherein 335 g of water was sprayed on the isolate and mixed until the protein was hydrated to a moisture level of 26% by weight. The hydrated isolate was subjected to extrusion on a Brabender extruder operated in accordance with Example 1. The temperature of the product just prior to the die in the extruder was measured as 121° C.

The stream of product was then granulated and dried as described in Example 1 to a moisture level of 5.6% by weight.

Rehydration rate and maximum rehydration capacity of the dried, granulated material was evaluated as set forth in Example 1 and determined to be the following:

|  | Hydration Rate g Water/g of Product | | |
| --- | --- | --- | --- |
|  | 5 minutes | 15 minutes | 30 minutes |
| Set #1 | 2.7 | 3.2 | 3.5 |
| Set #2 | 3.2 | 3.5 |  |
| Maximum Hydration Capacity | 3.8g of water/g of product. | | |

It was observed microscopically that the product of this Example did not have a homogeneous gel like appearance and was inferior to the product of Examples 1-4, produced by the process of the present invention, both in terms of hydration rate as well as maximum hydration capacity.

EXAMPLE 6

1000 g of soy protein isolate identified by the tradename "Promine D" and sold by Central Soya Company, Fort Wayne, Ind., was evaluated for gelling properties according to the procedure set forth above wherein triplicate samples of a gel were prepared using the above isolate. The force required to penetrate the surface of each gel sample was 211 g, 263 g, and 223 g respectively.

The 1000 g of isolate was blended with water in a Hobart mixer wherein 2000 g of water was sprayed on the isolate and mixed until the protein was hydrated to a moisture level of 67% by weight. The hydrated protein isolate was extruded with a Brabender extruder operated in the manner set forth in Example 1. The product exiting the die as a continuous rope was observed to be a coherent, homogeneous product with a translucent appearance. The continuous stream of product was then subdivided to form a granulated material which was dried in the manner set forth in Example 1 to a moisture level of 4% by weight.

The granulated product was evaluated for rehydration rate as set forth in Example 1 and this was determined to be 3.8 g of water/g of sample at 5 minutes and 4.1 g of water/g of sample at 15 minutes. It may be seen that the product obtained in this Example exhibited the excellent rehydration characteristics desired in the product of the present invention.

EXAMPLE 7

A soy protein isolate identified by the tradename "Supro 620" and sold by Ralston Purina Company, St. Louis, Mo., was evaluated for gelling properties, according to the procedure described in the specification. The average force required to penetrate the surface of the gel sample was 204 g.

50 lbs. of the above isolate was blended with water in a mixing apparatus wherein water was sprayed on the isolate and mixed until the protein was hydrated to a moisture level of 67% by weight.

The hydrated protein isolate was fed into a Wenger X-20 Extruder, manufactured by Wenger Manufacturing Company, Sabetha, Kans., equipped with seven barrel sections with the first three sections from the feed end of the extruder being straight sections with the ribs or rifling on the interior of the barrel parallel to the direction of extrusion and the last four being spiral sections which has the ribs arranged in spiral fashion. The screw was operated at 310 rpm. A multi-orificed die was employed having four openings, each opening being 0.75 inches in diameter. The temperature in all the barrel sections was maintained at 280°-290° F. A thermocouple just prior to the die measured the product as having a temperature of 85° C.

The continuous stream of product was subdivided with a cut-off knife attached to the extruder, followed by further granulation on a cutting apparatus then dried on a forced air dryer at 210° F. for 30 minutes to a moisture level of 6% by weight. The dried, granulated protein gel was evaluated for rehydration properties according to the procedure set forth in Example 1 and determined to be the following:

|  | g H₂O/g of Product | |
| --- | --- | --- |
|  | 5 minutes | 15 minutes |
| Set #1 | 4.3 | 4.5 |
| Set #2 | 4.1 | 4.5 |

The above Examples represent illustrative but non-limiting embodiments of the present invention and it is to be understood that variations can be made with the materials, steps or apparatus described without departing from the spirit of the instant invention. It is further intended to include such reasonable variations within the scope of the present invention and appended claims.

What is claimed is:

1. A process of forming dried granulated protein gel capable of rehydration with water under ambient conditions and in a rehydrated state being suitable as a meat extender comprising:
   (a) hydrating a vegetable protein isolate having gel forming properties, with water to form a mixture having about 60-75% by weight of added water, and isolate having a protein content of at least about 90% by weight, said gel forming properties being defined as the ability of the isolate to form an aqueous protein gel upon heating of a slurry of the isolate having a viscosity at about 25° C. of between about $0.9-1.1 \times 10^6$ cps, at about 100° C. for about 30 minutes, with the gel formed in this manner having sufficient strength to require at least about 50 g of force to penetrate the surface of the gel;
   (b) extruding the hydrated isolate at a temperature of between about 75°-125° C. to form a protein gel, and
   (c) granulating and drying said gel to achieve a shelf stable moisture content under non-puffing conditions.

2. The process of claim 1 wherein the vegetable protein isolate is a soy protein isolate.

3. The process of claim 1 wherein the isolate is hydrated with about 65-70% by weight of added water.

4. The process of claim 1 wherein the hydrated isolate is heated to a temperature of between about 80°-100° C.

5. The process of claim 1 wherein the gel is air dried at a temperature below about 250° F.

6. The process of claim 5 wherein the gel is air dried at a temperature below about 210° F.

7. The process of claim 6 wherein the gel is air dried at a temperature of 190°-210° F.

8. A process of forming a dried, granulated protein gel capable of rehydrating with at least 4 times its weight in water, under ambient conditions and in a rehydrated state being suitable as a meat extender comprising:
   (a) hydrating a soy protein isolate having gel forming properties, with water to form a mixture having about 60-75% by weight of added water, said gel forming properties being defined as the ability of the isolate to form an aqueous protein gel upon heating of a slurry of the isolate having a viscosity at about 25° C. of between about $0.9-1.1 \times 10^6$ cps at about 100° C. for about 30 minutes, with the gel formed in this manner having sufficient strength to require at least about 50 g of force to penetrate the surface of the gel,
   (b) extruding the hydrated isolate at a temperature of between about 75°-125° C. to form a protein gel, and
   (c) granulating and drying said gel at an air temperature below about 250° F. to achieve a shelf stable moisture content.

9. The process of claim 8 wherein the vegetable protein isolate is a soy protein isolate.

10. The process of claim 8 wherein the isolate has a protein content of at least about 90% by weight.

11. The process of claim 8 wherein the isolate is extruded at a temperature of between about 80°-100° C.

12. The process of claim 8 wherein the isolate is hydrated with between about 65-70% by weight of added water.

13. The product produced by the process of claim 1.

14. The product produced by the process of claim 8.

* * * * *